(12) United States Patent
Willey

(10) Patent No.: US 8,588,117 B2
(45) Date of Patent: Nov. 19, 2013

(54) APPARATUS, AND ASSOCIATED METHOD, FOR PAGING AN ACCESS TERMINAL IN A RADIO COMMUNICATION SYSTEM USING SEQUENTIALLY ASSIGNED QUICK PAGE IDENTIFIERS

(75) Inventor: William Daniel Willey, Gilroy, CA (US)

(73) Assignee: BlackBerry Limited, Waterloo (CA)

( * ) Notice: Subject to any disclaimer, the term of this patent is extended or adjusted under 35 U.S.C. 154(b) by 1452 days.

(21) Appl. No.: 12/052,500

(22) Filed: Mar. 20, 2008

(65) Prior Publication Data

US 2008/0232289 A1 Sep. 25, 2008

Related U.S. Application Data

(60) Provisional application No. 60/896,543, filed on Mar. 23, 2007.

(51) Int. Cl.
*G08C 17/00* (2006.01)
*H04B 7/216* (2006.01)
*H04M 1/00* (2006.01)

(52) U.S. Cl.
USPC ............ 370/311; 370/335; 370/342; 455/574

(58) Field of Classification Search
USPC .......................................... 370/311
See application file for complete search history.

(56) References Cited

U.S. PATENT DOCUMENTS 6,505,058 B1 * 1/2003 Willey .......................... 455/574
2007/0015523 A1 * 1/2007 Prakash et al. ................ 455/458

* cited by examiner

*Primary Examiner* — Noel Beharry

(57) ABSTRACT

An apparatus, and an associated method, for facilitating paging of an access terminal. A hash function is performed at a network entity to form a hash value. The hash value is utilized to identify a paging packet that is to be populated with paging information. Once formed, the paging packet is sent as part of a superframe of packets. The access terminal also performs the hash function to determine to where to hash to search for the paging information.

20 Claims, 3 Drawing Sheets

APPARATUS, AND ASSOCIATED METHOD, FOR PAGING AN ACCESS TERMINAL IN A RADIO COMMUNICATION SYSTEM USING SEQUENTIALLY ASSIGNED QUICK PAGE IDENTIFIERS

CROSS REFERENCE TO RELATED APPLICATIONS

The present invention claims the priority of provisional patent application No. 60/896,543, filed on Mar. 23, 2007, the contents of which are incorporated by reference herein.

The present invention relates generally to a manner by which to page an access terminal of a radio communication system to alert the access terminal of a pending call, or other communication. More particularly, the present invention relates to apparatus, and an associated method, that provides for sequential assignation of quick page identifiers that are used pursuant to the generation, sending, and analysis of a quick page message upon a paging channel, such as a QPCH (quick paging channel) defined in an exemplary cellular communication system. The assignations are made and used in a page message that permits reduction in the likelihood of occurrence of false wakeup of an access terminal. Excessive battery depletion, as a result of false wakeup of the access terminal, is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also providing the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard that defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH that contains quick page indicators. The quick page message includes a number of quick page indicator slots populated with quick page indicators.

During operation, a mobile station hashes to a quick page indicator location, i.e., slot, within the quick page message based upon a session seed, a 32-bit pseudorandom number, an ATI (access terminal indicator), or other pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In the existing scheme, however, the access terminal is susceptible to the occurrence of a false wakeup, that is, the access terminal does not enter into a sleep state but, rather, the access terminal enters into an active state to monitor the regular control channel for reception of regular control channel MAC messages even though there shall be no message for the access terminal. Because the communication system is a multi-user system, there is a possibility that another access terminal that is being paged has its page indication hashed to the same page indication slot. As the number of access terminals that are paged in a system increases, the likelihood of occurrence of a false wakeup correspondingly increases.

A UMB (ultra mobile broadband) standard that shall be published as 3GPP2 Document C.S0084 is anticipated to set forth protocols relating to hashing of multiple paging indicators using a 32-bit, (QuickPageID). The 32-bit value forms an input to a hash function whose resultant hashes are determinative of the bits that are populated with values that identify whether an access terminal is being paged. The value of the 32-bit, quick page ID can be defined with a default value, formed of a hash of a pseudo-random number. The default value is alternately formable in other manners using other suitably-random numbers, such as the least 32-significant bits of the session seed. The anticipated text further includes for the possibility of access network override of a default quick page ID value with an alternate assignation. When the alternate assignation is made, a preferred quick page enable bit is set to a logical value of one, a preferred quick page ID field is set to an overriding value, and the two values are sent to an access terminal in a preferred paging attribute. If the preferred quick page enabled bit is set to the logical one value, the access terminal uses the preferred quick page ID as its quick page ID value.

Bits of the quick page ID are used by the access terminal for partial identity comparison for quick page messages including two, three, or four partial addresses. And, the values are also used for hashing of the paging indicators.

In various scenarios, it is desirable for the default quick page ID to be overridden. For instance, in one scenario, the number of access terminals that are monitoring the quick paging channel is small enough to permit the access terminals each to have its own paging indicator. Sequential assignations, e.g., of quick page IDs are provided to the successive ones of the access terminals.

An analogous approach can be used when two or three paging indicators per page message formats are utilized. There is an increased likelihood of increased false wakeup probability due to the possibility of too many access terminals hashing to the same paging indicator. And, e.g., if a simple modulo function is utilized, uneven hashing distribution also results in an increased false wakeup probability. Additionally, while additional manners, i.e., non-sequential manners, are available by which to take assignations in a manner to enable a small number of access terminals to have unique paging indicators, similar high levels of false wakeup probabilities occur. For instance, a table of pre-computed quick page IDs that map to particular paging indicators can be used. But, such schemes are also of greater complexity than a sequential assignment scheme.

In short, there remains a need for an improved manner by which to provide for assignment of quick page IDs that results in a reduced false wakeup probability.

It is in light of this background information related to paging by an access network of an access terminal that the significant improvements of the present invention have evolved.

DETAILED DESCRIPTION

Figure 1:
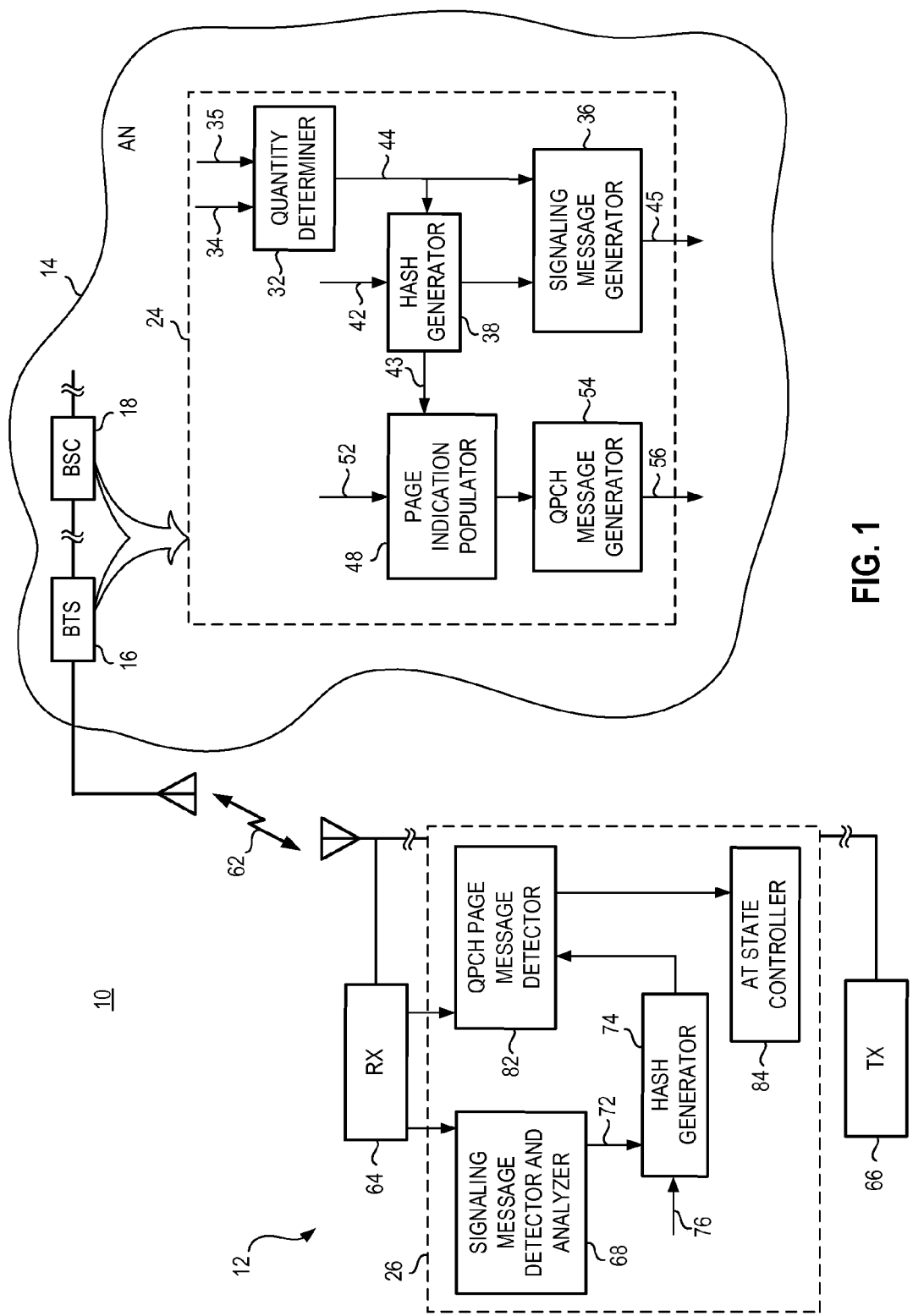
FIG. 1 illustrates a functional block diagram of a radio communication system in which an embodiment of the present invention is operable.

The present invention, accordingly, advantageously provides apparatus, and an associated method, by which to page an access terminal of a radio communication system to alert the access terminal of a pending call, or other communication.

Through operation of an embodiment of the present invention, a manner provides for the sequential assignment of quick page identifiers that are used pursuant to the generation, sending, and analysis of a quick page message upon a quick paging channel (QPCH) defined in a CDMA 2000 EV-DO cellular, or other, communication system.

In one aspect of the present invention, the assignations are made and used in a page message that permits reduction in the likelihood of occurrence of false wake up of an access terminal. By reducing the likelihood of occurrence of false wakeup, excessive battery depletion that might otherwise occur as a result of false wakeup of an access terminal is less likely to occur.

In one aspect of the present invention, hashing is performed at both an access network and at an access terminal using the same input number, a pseudorandom number, such as a session seed defined in the CDMA 2000 EV-DO Operating Specification Standard, or, e.g., an access terminal identifier (ATI). The hashing is carried out through performance of a hash function that takes three arguments, a key value, here, e.g., the ATI of the access terminal, an N value, the number of resources, and a decorrelate value that forms an argument used to de-correlate values that are obtained for different applications for the same access terminal. The hash function, when performed, defines a hash value that is determinative of to where in a quick page message that a paging bit associated with an access terminal is placed. The hash value is also determinative of to where in a received quick page that the access terminal searches, i.e., hashes, to determine whether an incoming page is forthcoming. The selected hash function performs operation such that the resultant hash value associated with different access terminals is amenable to relatively even distribution and sequential assignment of quick page IDs.

In another aspect of the present invention, quick page formats are provided. The selected format, e.g., is dependent upon the number of access terminals that are paged. A three-bit field prepended to a message identifies the format-type. And, eight message format-types are definable.

In a first format, the full page ID of the access terminal being paged is included in the message. In a second format, two partial identities of the access terminal being paged are included in the message. In a third format, three partial identities of the access terminals being paged are included in the message. In a fourth format, four partial identities of the access terminals being paged are included in the format. In a fifth format, three paging indicators for each access terminal being paged are included in the message. In a sixth format, two paging indicators for each access terminal being paged are included in the message. In a seventh format, the message includes one paging indicator for each access terminal being paged. Anywhere from zero to fifteen or more access terminals are paged, using a selected page format in which hashing is performed with a more even distribution than that available in conventional sequential assignment schemes.

In these and other aspects, therefore, apparatus, and an associated method is provided for an access network that selectably generates a first page message on a first paging channel. A page indication populator is configured to populate the first page message with a selected number of page indications. The hasher is configured to generate hash values that identify where in the first page message that a page is to be populated. Hash operations performed by the hasher provide for a more even distribution of paging indicator bit positions.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, the access terminal is alerted, by broadcast of page messages when a communication, initiated at the network, is to be terminated at the access terminal. A quick paging channel (QPCH), or analogous channel, is defined. Quick page indications, populating a quick page message, are of values that identify whether an access terminal is being paged. However, also as noted previously, particularly during times of heavy usage, a false wakeup of the access terminal might occur due to a quick page indication in the message intended for one access terminal being broadcast within a slot that is also used by another of the access terminals. False wakeup prevents an access terminal from entering into a power-saving sleep mode.

Accordingly, pursuant to an embodiment of the present invention, the access network includes apparatus 24, and the access terminal includes apparatus 26, that operate to reduce the likelihood of the occurrence of false wakeup. The elements of the apparatus 24 and the apparatus 26 are functionally represented, implementable in any desired manner, including, for instance, by algorithms executable by processing circuitry.

The elements forming the apparatus 24 are implemented at any appropriate location of the access network 14, including, as illustrated, at the BTS 16 and BSC 18 or distributed amongst such entities as well as others.

Here, the apparatus 24 includes a quantity of hashes/page indications per access terminal determiner (Quantity Determiner) 32. The determiner is coupled to receive, as input indicia, indications of network activity on the line 34. The network activity is quantified, for instance, in a number of page values. The network is aware, e.g., of the number of access terminals being paged. Or, the number of page values comprises, e.g., an expected number of pages, an average number of prior pages, or other paging quantity indicia. Responsive to the indication of the network activity, the determiner 32 determines the number of hashes that are to be generated and the number of page indications that are to be provided pursuant to paging of an access terminal in a quick paging message. In an alternate implementation, the number of hash values is a set number, e.g., a fixed number greater than one. The fixed number of two, e.g., appears to work well when the number of page indication locations in a quick page message is about one hundred eighty. The number of hash values and number of page indications per page correspond.

An indication of the determined quantity is provided to a signaling message generator 36 and to a hash generator (Hasher) 38.

A number known to both the access network and to the access terminal, here an access terminal identifier (ATI) is provided to the hash generator 38, here represented by way of the line 42. The number alternately is defined otherwise, such as a session seed or another pseudorandom number. The access terminal identifier forms a key formed of 32 bits. The key is divided into two words, word L and word H. The word L is formed of bits 0-15 of the key and the word H is formed of the bits 16-31 of the key. Bit 0 is the least significant bit of the key. In operation, the hasher also utilizes an N argument that responds to the number of resources and a de-correlate argument, an argument that is used to de-correlate values obtained for different applications for the same access terminal.

The hash generator generates hash values according to the following operation:

$$R = \lfloor N \times ((40503 \times (L \oplus H \oplus \text{Decorrelate})) \bmod 2^{16})/2^{16} \rfloor$$

This formula is adapted from Knuth, D. N., *Sorting and Searching*, vol. 3 of *The Art of Computer Programming*, 3 vols., (Reading, Mass.: Addison-Wesley, 1973), pp. 508-513. The symbol $\oplus$ represents bitwise exclusive- or function (or modulo 2 addition) and the symbol $\lfloor \ \rfloor$ represents the "largest integer smaller than" function.

Various definitions are used, in addition to those described above. The definitions include:

The $i^{th}$ element of array A. The first element of the array is A[0].

$<e_1, e_2, \ldots e_n>$ A structure with elements '$e_1$', '$e_2$', ..., '$e_n$'. Two structures $E=<e_1, e_2, \ldots, e_n>$ and $F=<f_1, f_2, \ldots, f_m>$ are equal if and only if 'm' is equal to 'n' and $e_i$ is equal to $f_i$ for i=1, ... n. Given $E=<e_1, e_2, \ldots, e_n>$ and $F=<f_1, f_2, \ldots, f_m>$, the assignment "E=F" denotes the following set of assignments: $e_i=f_i$, for i=1, ... n.

S.e The member of the structure 'S' that is identified by 'e'.

M[i:j] Bits $i^{th}$ through $j^{th}$ inclusive (i≥j) of the binary representation of variable M. M[0:0] denotes the least significant bit of M.

| Concatenation operator. (A|B) denotes variable A concatenated with variable B.

× Indicates multiplication.

$\lfloor x \rfloor$ Indicates the largest integer less than or equal to x: $\lfloor 1.1 \rfloor = 1$, $\lceil x \rceil$ Indicates the smallest integer greater or equal to x: $\lceil 1.1 \rceil = 2$,

|x| Indicates the absolute value of x: |−17|=17, |17|=17.

$\oplus$ Indicates exclusive OR (modulo-2 addition).

$\otimes$ Indicates bitwise logical AND operator.

min (x, y) Indicates the minimum of x and y.

max (x, y) Indicates the maximum of x and y.

x mod y Indicates the remainder after dividing x by y: x mod $y = x - (y \times \lfloor x/y \rfloor)$.

x^y Indicates the result of x raised to the power y, also denoted as $x^y$.

$x^y$ Indicates the result of x raised to the power y, also denoted as x^y.

The hash value, so-obtained, is generated on the line 43. The formula by which the hash value is calculated provides for better distribution of the hashing when sequential assignation of the quick paging identifiers to the access terminals is made.

The signaling message generator 36 to which the value determined by the determiner 32 is provided generates a signaling message, here generated upon the line 45, that identifies the quantity determined by the determiner. The signaling message is broadcast to the access terminal 12, thereby to alert the access terminal of the determined quantity. The signaling message generator 36 may operate in conjunction with the QPCH generator 54 and include the quantity in the QPCH message 56. The hash values created by the hash generator 38 are provided to a page indication populator 48. The page indication populator 48 is also provided with a network communication request, here provided by way of the line 52. The page indication populator selects page indication values depending upon whether the access terminal is to be paged. For instance, when an access terminal is to be paged, the page indication values are logical "1" values. In one implementation, all values are initially logical "0" values and then set as appropriate. The page indication values and their associated page indication locations, defined by the hash values generated by the hash generator 38, are provided to a QPCH, or other, message generator 54. The message generator 54 forms a page message 56 that includes a plurality of page indication locations. The page indication populator 48 populates selected page indication locations of the message with the page indication values. The locations populated with a page indication value are determined by the hash values generated by the hash generator 38. In like manner, page indications are formed for other access terminals and hash values are generated to define at where in the page message the page indications intended for other access terminals are populated in the message 56 generated by the message generator 54. When the resultant message 56 is broadcast by the access network, access terminals, such as the access terminal 12, are provided with an indication of whether the access terminal is to be paged.

Transceiver elements of the base transceiver station 16 cause broadcast of the messages generated by the message generator 54 of the apparatus 24 upon a radio air interface, represented in FIG. 1 by the arrow 62. The message is delivered to the access terminal 12 as well as other access terminals within reception range of the broadcast message. The access terminal 12 includes transceiver circuitry, here represented by a receive part 64 and a transmit part 66. The receive part 64 operates to receive signals sent thereto, such as the messages generated by the apparatus 24 of the access network. And, certain of the detected signals are provided to the apparatus 26. Of significance here are detections of the signaling message generated by the signaling message generator 56 of the access network and of the page message generated by the message generator 54.

Indications are provided to a signaling message detector and analyzer 68. The detector and analyzer operate to detect the contents of the signaling message and analyze the detected message to ascertain the number of hashes, or page indications, per access terminal indicated in the message. Indications are provided, here by way of the line 72, to a hash generator 74. The hash generator 74 is also provided with values of the input number, here indicated to be provided by way of the line 76, known to both the access network and access terminal. In the exemplary implementation, the input number comprises the ATI of the access terminal. In other implementations, the input number is otherwise formed, as described above. The hash generator 74 operates in manners analogous to operation of the hash generator 38 of the access network to perform hash functions upon the input number. And, the input number provided to the hash generator 74 corresponds to the input number provided to the hash generator 38 on the line 42. The number of hash values generated by the hash generator corresponds to the number identified by the detector and analyzer 68. Hash values created by the hash generator 74 are provided to a QPCH (Quick Paging Channel), or other, page message detector 82. The hash values created by the hash generator 74 identify to the page message detector 82 which of the page indication locations that should be monitored to determine whether a page is broadcast to the access terminal. The message broadcast by the access network and detected and operated upon by the access terminal is an atomic message. That is to say, all of the bits are received in a single message. Responsive to detections made by the detector 82, an indication is provided to an access terminal (AT) state controller 84 to control the state into which the access terminal is placed. And, when the QPCH message indicates that the access terminal is paged, the access terminal begins to monitor a second page channel, for broadcast of a second page message thereon. The receive part of the access terminal also monitors the second page channel. The page indications in the message generated by the message generator 54 are therefore sent pursuant to, i.e., in furtherance of the sending of the second page message on the second page channel.

In the event that the message detector 82 indicates no page message broadcast to the access terminal, the state controller 84 places the access terminal into a sleep mode.

Various quick page formats are defined. In the exemplary implementation eight quick page formats are defined identified by formats 000-111.

Figure 2:
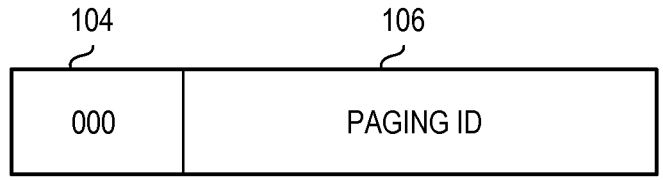
FIG. 2 illustrates a quick page block formatted in a '000' quick page format pursuant to an embodiment of the present invention.

FIG. 2 illustrates the format shown generally at 102, of the quick page format 000. A format identifier field 104 is populated with the values 000, and a paging ID field 106 is of a 32-bit length. A description of this quick page format is as follows:

QuickPageFormat='000'

In this case, the protocol shall issue a PageReceived indication, accompanied by the received QuickPageFormat, if the PagingID in the QuickPageBlock matches the PagingIDList of the Route Control Protocol.

| QuickPage Format with QuickPageFormat = 0x0 | | |
|---|---|---|
| Field | Length (bits) | Value |
| QuickPageFormat | 3 | 0x0 |
| PagingID | 32 | ID of paged terminal |

Figure 3:
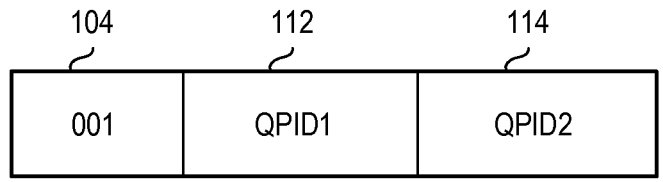
FIG. 3 illustrates a quick page block formatted in a '001' quick page format pursuant to an embodiment of the present invention.

A quick page format 001 is also defined. FIG. 3 illustrates the format 108 of this format. Again, the format includes a format identifier field 104, here populated with the values 001 and two quick page identifier fields 112 and 114, each of 16-bit lengths. A description of the 001 format is as follows:

QuickPageFormat='001'

In this case, the protocol shall generate a QuickPageReceived indication, accompanied by the received QuickPageFormat, if the least significant bits of QuickPageID that is public data of the Idle State Protocol match one of the QuickPageIDi fields in the QuickPageBlock, where the fields of the QuickPageBlock are as described. The access terminal may also generate a PageReceived indication if an access terminal implementation dependent algorithm determines that the probability of quick page collision is sufficiently low.

| QuickPage Format with QuickPageFormat = 0x1 | | |
|---|---|---|
| Field | Length (bits) | Value |
| QuickPageFormat | 3 | 0x1 |
| QuickPageID1 | 16 | QuickPageIDLSBs |
| QuickPageID2 | 16 | QuickPageIDLSBs |

Figure 4:
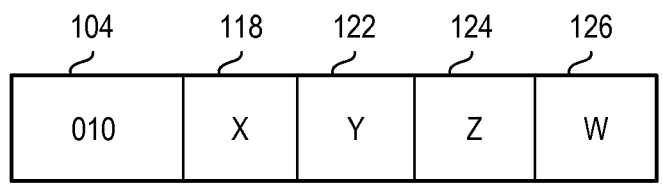
FIG. 4 illustrates a quick page block formatted in a '010' quick page format pursuant to an embodiment of the present invention.

FIG. 4 illustrates the format 116 of format 010 defined in the exemplary implementation of an embodiment of the present invention. Again, the format includes a quick page format identifier field 104, here populated with the value 010. And, fields 118, 122, 124, and 126 of 11, 1, 10, and 10 bits, respectively, are further shown to be included in the quick page block 116. The 010 quick page format is definable as follows:

QuickPageFormat='010'

In this case, the format of the QuickPageBlock is defined. Based on the fields x, y, z and w, the access terminal shall generate the quantities QuickPageID 1, QuickPageID2, and QuickPageID3 as follows:

If EnableQuickPageOrdering is equal to 0 or if z is equal to w, then QuickPageID1=x. Otherwise QuickPageID1 is a 12 bit quantity whose 11 LSBs are given by x, and whose MSB is set to 1 if z>w, and whose MSB is set to 0 otherwise.

QuickPageID2 is given by an 11 bit quantity whose MSB is given by y and whose 10 LSBs are given by z.

If EnableQuickPageOrdering is equal to 0, then QuickPageID3=w. Otherwise QuickPageID3 is given by an 11 bit quantity whose MSB is given by y and whose 10 LSBs are given by w.

The protocol shall generate a QuickPageReceived indication, accompanied by the received QuickPageFormat, if the least significant bits of QuickPageID that is public data of the Idle State Protocol match one of the QuickPageIDi fields generated according to the procedure above. The protocol may also generate a QuickPageReceived indication, accompanied by the received QuickPageFormat, if the least significant bits of QuickPageID that is public data of the Idle State Protocol match one of x, y|z or w, where y|z denotes a 11-bit quantity with y being the MSB and z being the 10 LSBs.

| QuickPage Format with QuickPageFormat = 0x2 | | |
|---|---|---|
| Field | Length (bits) | Value |
| QuickPageFormat | 3 | 0x2 |
| x | 11 | LSBs of QuickPageID1 |
| y | 1 | MSB of QuickPageID2 |
| z | 10 | LSBs of QuickPageID2 |
| w | 10 | LSBs of QuickPageID3 |

Figure 5:
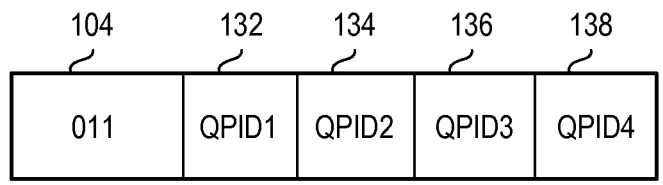
FIG. 5 illustrates a quick page block formatted in a '011' quick page format pursuant to an embodiment of the present invention.

FIG. 5 illustrates a quick page block formatted pursuant to a quick page format 011. The block 128 is again shown to include a format field 104, here populated with the values 011 and four page identifier fields 132, 134, 136, and 138, each of 8-bit lengths. In the exemplary implementation, the 011 format is definable as follows:

QuickPageFormat='011'

In this case, the protocol shall generate a QuickPageReceived indication, accompanied by the received QuickPageFormat, if the least significant bits of QuickPageID that is public data of the Idle State Protocol match one of the QuickPageIDi fields in the QuickPageBlock, where the fields of the QuickPageBlock are as described.

| QuickPage Format with QuickPageFormat = 0x3 | | |
|---|---|---|
| Field | Length (bits) | Value |
| QuickPageFormat | 3 | 0x3 |
| QuickPageID1 | 8 | QuickPageIDLSBs |
| QuickPageID2 | 8 | QuickPageIDLSBs |
| QuickPageID3 | 8 | QuickPageIDLSBs |
| QuickPageID4 | 8 | QuickPageIDLSBs |

Figure 6:
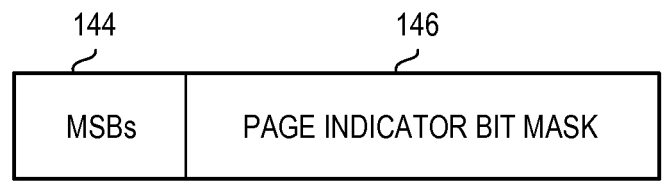
FIG. 6 illustrates a quick page block formatted in a '100' or '101' quick page format pursuant to an embodiment of the present invention.

FIG. 6 illustrates a quick page block 142 of the 100 and 101 formats of an embodiment of the present invention. The block includes a 2-bit field 144 and a page indicator bit mask field 146 of a 33-bit length. In the exemplary implementation, which is preferably used when quick page IDs are assigned sequentially, the 100 or 101 format is definable as follows:

QuickPageFormat='100' or QuickPageFormat='101'

In this case, the format of the QuickPageBlock is defined. The access terminal shall compute three integers x, y and z in the range $0 \leq x,y,z < 33$ according to the following procedure:

The access terminal shall set x, y', and z' equal to the output of the hash function using Decorrelate values of SessionSeed [47...32], SessionSeed[63.48], and SessionSeed [79.64], respectively, and using N values of 33, 32, and 31, respectively. When applying the hash function in order to calculate x, y', and z', the access terminal shall set Key=SessionSeed, which is given as public data of the Session Management Protocol.

Define y=y' if y'<x and y=y'+1 if y'≥x.

Define minxy=min(x,y) and maxxy=max(x,y). Define z=z' if z'<minxy, z=z'+1 if minxy≤z'<maxxy-1, and z=z'+2 if z'≥maxxy-1.

The protocol shall generate a QuickPageReceived indication, accompanied by the received QuickPageFormat, if both the bits $p_x$ and $p_y$ in the PageIndicatorBitMask field of the QuickPageBlock are set to 1.

| QuickPage Format with QuickPageFormat = 0x4 or 0x5 | | |
|---|---|---|
| Field | Length (bits) | Value |
| QuickPageFormatMSBs | 2 | 0x2 |
| PageIndicatorBitMask | 33 | $p_{32}p_{31} \cdots p_0$ |

In an alternate implementation for the QuickPageFormat='100' or QuickPageFormat='101', alternate procedures are used; the alternate procedures can be used when sequential assignation of quick page IDs is not important. In this case, x and y are calculated in another manner. The access terminal shall compute three integers x, y and z in the range $0 \leq x,y,z < 33$ according to the following procedure:

Let $b_{29}b_{28}b_{27} \ldots b_0$ be the 30 LSBs of the QuickPageID quantity that is pubic data of the Idle State Protocol. Define x', y' and z' to be integers in the range $0 \leq x',y',z' < 1023$, with their 10-bit binary representations being given by $b_{29}b_{28} \ldots b_{20}$, $b_{19}b_{18} \ldots b_{10}$, and $b_9b_8 \ldots b_0$ respectively.

Define x=x' mod 33.

Define y=y' mod 32. Define y=y" if y"<x and y=y"+1 if y"≥x.

Define z"=z' mod 31. Define minxy=min(x,y) and maxxy=max(x,y). Define z=z" if z"<minxy, z=z"+1 if minxy≤z"<maxxy-1, and z=z"+2 if z"≥maxxy-1.

The protocol shall generate a QuickPageReceived indication, accompanied by the received QuickPageFormat, if all of the bits $p_x$, $p_y$, and $p_z$ in the PageIndicatorBitMask field of the QuickPageBlock are set to 1.

| QuickPage Format with QuickPageFormat = 0x4 or 0x5 | | |
|---|---|---|
| Field | Length (bits) | Value |
| QuickPageFormatMSBs | 2 | 0x2 |
| PageIndicatorBitMask | 33 | $p_{32}p_{31} \cdots p_0$ |

Figure 7:
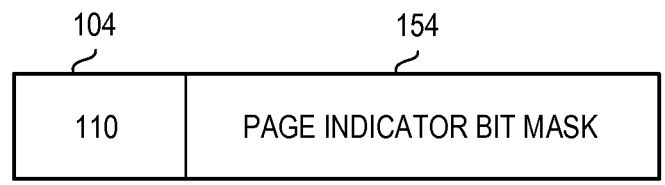
FIG. 7 illustrates a quick page block formatted in a '110' quick page format pursuant to an embodiment of the present invention.

FIG. 7 illustrates a quick page block 152 of a 110 quick page format. Here, the block includes a quick page format identifier field 104 of a 3-bit length and a page indicator bit mask field 154 of a 32-bit length. In the exemplary implementation, which is preferably used when quick page IDs are assigned sequentially, the 110 format is definable as follows:

QuickPageFormat='110'

In this case, the format of the QuickPageBlock is defined. The access terminal shall compute two integers x and y in the range $0 \le x,y < 32$ according to the following procedure:

The access terminal shall set x and y' equal to the output of the hash function using Decorrelate values of SessionSeed[47 ... 32] and SessionSeed[63 ... 48], respectively, and using N values of 32 and 31, respectively. When applying the hash function in order to calculate x and y', the access terminal shall set Key=SessionSeed, which is given as public data of the Session Management Protocol.

Define y=y' if y'<x and y=y'+1 if y'≥x.

The protocol shall generate a QuickPageReceived indication, accompanied by the received QuickPageFormat, if both the bits $p_x$ and $p_y$ in the PageIndicatorBitMask field of the QuickPageBlock are set to 1.

| QuickPage Format with QuickPageFormat = 0x6 | | |
|---|---|---|
| Field | Length (bits) | Value |
| QuickPageFormat | 3 | 0x6 |
| PageIndicatorBitMask | 32 | $p_{32}p_{31} \cdots p_0$ |

In an alternate implementation for the QuickPage format of QuickPageFormat='110, alternate procedures are used; the alternate procedures can be used when sequential assignation of quick page IDs is not important. In this case, the access terminal shall compute two integers x and y in the range $0 \le x,y < 32$ according to the following procedure:

Let $b_{14}b_{13}b_{12} \ldots b_0$ be the 15 LSBs of the QuickPageID quantity that is pubic data of the Idle State Protocol.

Define x in terms of its five bit binary representation as $b_{14}b_{13} \ldots b_{10}$.

Define y' to be an integers in the range $0 \le y' < 1023$, with its 10-bit binary representations being given by $b_9 b_8 \ldots b_0$.

Define y''=y' mod 31. Define y=y'' if y''<x and y=y''+1 if y''≥x.

The protocol shall generate a QuickPageReceived indication, accompanied by the received QuickPageFormat, if both the bits $p_x$ and $p_y$ in the PageIndicatorBitMask field of the QuickPageBlock are set to 1.

| QuickPage Format with QuickPageFormat = 0x6 | | |
|---|---|---|
| Field | Length (bits) | Value |
| QuickPageFormat | 3 | 0x6 |
| PageIndicatorBitMask | 32 | $p_{31}p_{31} \cdots p_0$ |

Figure 8:
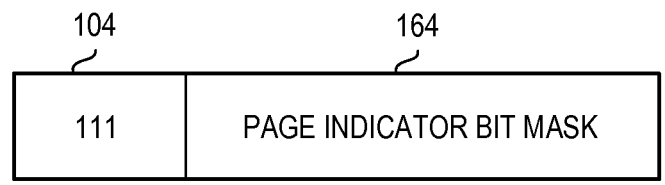
FIG. 8 illustrates a quick page block formatted in a '111' quick page format pursuant to an embodiment of the present invention.

FIG. 8 illustrates a quick page block 162 of a 111 quick page format. Here, also, the block includes a format identifier field 104, a 3-bit field, here populated with the values 111. The block also includes a page indicator bit mask field 164 of a 32-bit length. In the exemplary implementation, the 111 format is definable as follows:

In this case, the format of the QuickPageBlock is defined. The access terminal shall compute an integer x in the range $0 \le x < 31$ whose binary representation is given by the 5 LSBs of the QuickPageID quantity that is public data of the Idle State Protocol. The protocol shall generate a QuickPageReceived indication, accompanied by the received QuickPageFormat, if the bit $p_x$ in the PageIndicatorBitMask field of the QuickPageBlock is set to 1.

| QuickPage Format with QuickPageFormat = 0x7 | | |
|---|---|---|
| Field | Length (bits) | Value |
| QuickPageFormat | 3 | 0x7 |
| PageIndicatorBitMask | 32 | $p_{31}p_{31} \cdots p_0$ |

In exemplary operation, for a scenario of a small number of quick page IDs that are assigned sequentially to access terminals in a particular cell, the access network always uses the one paging indicator per page message format of format 111, here shown with respect to FIG. 8.

In a scenario in which a larger number of quick page IDs are assigned, or in a scenario in which the access network in unable to guarantee that the access terminals that are monitoring a particular cell have a single paging indicator that is not shared with other access terminals that monitor the cell, the access network determines the quick page message format based upon the number of pages. An exemplary mapping is as follows:

| Number of ATs paged | Quick Page Format | |
|---|---|---|
| 0 | '100', '110', or '111' | Format using paging indicators with all paging indicators set to '0' |
| 1 | '000' | Format includes the full page ID of the AT being paged |
| 2 | '001' | Format includes two partial identities of the ATs being paged |
| 3 | '010' | Format includes three partial identities of the ATs being paged |
| 4 | '011' | Format includes four partial identities of the ATs being paged |
| 5 to 9 | '100' or '101' (i.e. leading format bits of '10') | Format includes three paging indicators for each AT being paged |
| 10 to 14 | '101' | Format includes two paging indicators for each AT being paged |

-continued

| Number of ATs paged | Quick Page Format | |
|---|---|---|
| 15 or more | '111' | Format includes one paging indicator for each AT being paged |

Thereby, a manner is provided by which to provide for sequential assignation of quick page identifiers, if possible, or otherwise make assignation to facilitate reduction in the possibility of occurrence of false wakeup.

A superframe is defined in the 3GPP2 specification C.S0084-002-0 v1.0. A plurality of QPCH packets can be sent in a superframe if the amount of frequency spectrum used for the forward link exceeds a threshold. The number of QPCH packets per superframe is larger depending upon the amount of frequency spectrum used and would typically be no more than four; the number of QPCH packets per superframe is represented by a variable, NumQuickPageBlocksPerSF. Successive ones of the packets are identified by an index. A QPCH packet contains the quick page message, which is also sometimes referred to as a quick page block, that is to say, a paging packet. The network selects both in which of the packets and at which location or locations in the packet that the paging information, i.e., page indicator bits or partial identities, is placed. And, the network sends the QPCH messages on an F-QPCH.

An access terminal detects the appropriate QuickPaging Channel packet, decodes the packet, and determines whether the QuickPaging Channel message indicates paging of the access terminal. The access terminal decodes the F-QCPH that occurs in superframe indices where a quickpage may be received. Public data of the idle state protocol describes to the access terminal where a quick page may be received. If multiple quick paging channel packets are transmitted in the same superframe, the access terminal decodes the packet having an index equal to the result of application of a hash function. The hash function used to determine the QPCH packet must be chosen carefully in such a way as to minimize the probability of multiple ATs hashing to the same paging indicator of a QPCH packet.

In the exemplary implementation, a hash function is performed, at the network during the formation of a QPCH packet, and at the access pursuant to decoding of the packet. The hash function uses the following parameters:
  decorrelate value of 2×quick page id [11:0];
  N value of NumQuickPageBlocksPerSF;
  Key equal to quick page ID.

The quick page ID is public data of the idle state protocol. The access terminal declares the quick page block to be in error if there is an error in decoding the packet containing the block on the F-QCPH channel. The error information is usable, e.g., by the idle state protocol.

A hash value is formed using the hash function having such parameters facilitates improved randomness of the content of a QCPH packet, decreasing the false wake up probability. The hash function is utilized at both the network to determine at which page message to insert the paging indication and at the access terminal to determine to where to hash to detect whether the access terminal is paged on the quick paging channel. At the network, once the page message is selected, additional determination is made as to which location or locations to insert paging indication bits. Such determination is dependent, e.g., upon the format type of the page message, such as one of the format types '100' through '111' described herein. Analogous operation is carried out at the access terminal to determine to where in the page message to search for the paging indication bit or bits.

Presently preferred embodiments of the invention and many of its improvements and advantages have been described with a degree of particularity. The description is of preferred examples of implementing the invention and the description of the preferred examples is not necessarily intended to limit the scope of the invention. The scope of the invention is defined by the following claims.

What is claimed is:

1. A method for facilitating paging of an access terminal, said method comprising:
  generating a hash value that is a function of a decorrelate value, an N value, and a Key, wherein the decorrelate value comprises twelve bits of a QuickPageID multiplied by two, wherein the N value comprises a NumQuickPageBlocksPerSF, and the Key comprises a QuickPageID, wherein the QuickPageID is public data of the idle state protocol and the NumQuickPageBlocksPerSF is a number of paging packets per superframe of packets; and
  choosing one or more paging packets from the superframe of packets based upon the hash value.

2. The method of claim 1 further comprising hashing to a page indication location of the one or more paging packets.

3. The method of claim 2 wherein said hashing to the page indication location comprises hashing to a page indication location responsive to five significant bits of the QuickPageID.

4. The method of claim 3 wherein said hashing to the page indication location further comprises hashing to a page indication location responsive to a function of ten significant bits of the QuickPageID.

5. The method of claim 3 wherein the function of the ten significant bits comprises the ten significant bits mod 31 if the ten significant bits mod 31 is less than the five significant bits of the QuickPageID.

6. The method of claim 4 wherein the function of the ten significant bits comprises the ten significant bits mod 31 plus one if the ten significant bits mod 31 is greater than the five significant bits of the QuickPageID.

7. The method of claim 2 wherein said hashing to the page indication location comprises hashing to a page indication location responsive to a function of ten bits of the QuickPageID mod 33.

8. The method of claim 7 wherein said hashing to the page indication location further comprises hashing to a page indication location responsive to a function of ten bits of the QuickPageID mod 32.

9. The method of claim 8 wherein said hashing to the page indication location further comprises hashing to a page indication location responsive to a function of ten bits of the QuickPageID mod 31.

10. An apparatus for facilitating paging of an access terminal, said apparatus comprising:
  a generator configured to generate a hash value that is a function of a decorrelate value, an N value, and a Key, wherein the decorrelate value comprises twelve bits of a QuickPageID multiplied by two, wherein the N value comprises a NumQuickPageBlocksPerSF, and the Key comprises a QuickPageID, wherein the QuickPageID is public data of the idle state protocol and the NumQuickPageBlocksPerSF is the number of paging packets per superframe of packets; and a chooser configured to choose one or more paging packets, from the superframe of packets, based upon the hash value.

11. The apparatus of claim 10 further comprising a hasher configured to hash to a page indication location of the one or more paging packets.

12. The apparatus of claim 11 wherein said hasher is configured to hash to a page indication location responsive to five significant bits of the QuickPageID.

13. The apparatus of claim 12 wherein said hasher is further configured to hash to a page indication location responsive to a function of ten significant bits of the QuickPageID.

14. The apparatus of claim 13 wherein the function of the ten significant bits comprises the ten significant bits mod 31 if the ten significant bits mod 31 is less than the five significant bits of the QuickPageID.

15. The apparatus of claim 13 wherein the function of the ten significant bits comprises the ten significant bits mod 31 plus one if the ten significant bits mod 31 is greater than the five significant bits of the QuickPageID.

16. The apparatus of claim 11 wherein said hasher is configured to hash to a page indication location responsive to a function of ten bits of the QuickPageID mod 33.

17. The apparatus of claim 16 wherein said hasher is configured to hash to the page indication location further comprises hashing to a page indication location responsive to a function of ten bits of the QuickPageID mod 32.

18. The apparatus of claim 17 wherein said hasher is configured to hash to the page indication location further comprises hashing to a page indication location responsive to a function of ten bits of the QuickPageID mod 31.

19. A method for facilitating access terminal paging by a network, said method comprising:

generating a hash value that is a function of a decorrelate value, an N value, and a Key, wherein the decorrelate value comprises twelve bits of a QuickPageID multiplied by two, wherein the N value comprises a NumQuickPageBlocksPerSF, and the Key comprises a QuickPageID, wherein the QuickPageID is public data of the idle state protocol and the NumQuickPageBlocksPerSF is the number of paging packets per superframe of packets;

choosing one or more paging packet locations in the superframe of packets based upon the hash value; and populating the one or more paging packet locations with paging information.

20. A network apparatus for facilitating access terminal paging, said apparatus comprising:

a generator configured to generate a hash value that is a function of a a decorrelate value, an N value, and a Key, wherein the decorrelate value comprises twelve bits of a QuickPageID multiplied by two, wherein the N value comprises a NumQuickPageBlocksPerSF, and the Key comprises a QuickPageID paging indicia, the hash value of any page bit of a paging packet within a superframe of paging packets, wherein the QuickPageID is public data of the idle state protocol and the NumQuickPageBlocksPerSF is the number of paging packets per superframe of paging packets;

a chooser configured to choose one or more paging packet locations based upon the hash value; and a populator configured to populate the one or more paging packet locations with paging information.

* * * * *